United States Patent [19] [11] 4,409,912
Koronka et al. [45] Oct. 18, 1983

[54] AGRONOMIC IMPLEMENT

[75] Inventors: Amy M. E. Koronka, UpWaltham; Paul Koronka, Banbury, both of England

[73] Assignee: Imperial Chemical Industries PLC, London, England

[21] Appl. No.: 204,696

[22] Filed: Nov. 6, 1980

[30] Foreign Application Priority Data

Nov. 29, 1979 [GB] United Kingdom ............... 7941175
Apr. 3, 1980 [GB] United Kingdom ............... 8011376

[51] Int. Cl.³ .................................... A01C 23/02
[52] U.S. Cl. ................................ 111/7; 111/86; 172/150; 172/167; 172/196; 172/218; 172/669; 172/718; 172/720; 172/736
[58] Field of Search ............... 111/1, 6, 7, 85, 86; 172/699, 192, 292, 156, 700, 720, 701, 196, 686, 150, 218, 753, 736, 167, 718, 753, 698, 19, 20, 382, 664, 736, 739, 150, 196, 218, 669, 718; 171/3, 4, 19, 71, 103, 104, 107

[56] References Cited

U.S. PATENT DOCUMENTS

| 115,629 | 6/1871 | Miner ............................ 172/649 X |
| 983,629 | 2/1911 | Lundell ........................... 172/736 X |
| 1,549,633 | 0/1925 | Uzemack ........................ 172/192 |
| 2,272,190 | 2/1942 | Elliott ............................. 111/7 |
| 3,013,619 | 12/1961 | Szabo et al. ................. 172/167 |
| 3,140,745 | 7/1964 | Hinkle ........................... 172/292 |
| 3,231,025 | 1/1967 | Bodine ........................... 111/7 X |
| 3,326,152 | 6/1967 | Frantzen ....................... 172/699 X |
| 3,340,934 | 9/1967 | Wycoff ........................... 171/71 X |
| 3,447,495 | 6/1969 | Miller ............................. 37/193 X |
| 3,744,260 | 7/1973 | Lucero ........................... 37/193 X |
| 3,865,056 | 2/1975 | Danford ......................... 111/7 |
| 3,898,940 | 8/1975 | Ede ............................... 111/1 |
| 4,055,126 | 10/1977 | Brown ........................... 111/85 |

FOREIGN PATENT DOCUMENTS

| 11398 | of 0000 | Australia ........................ 111/7 |
| 537666 | 3/1957 | Canada .......................... 172/699 |
| 546186 | 9/1957 | Canada .......................... 172/699 |
| 1942967 | 5/1970 | Fed. Rep. of Germany .... 111/85 |
| 1938050 | 1/1971 | Fed. Rep. of Germany .... 172/382 |
| 2088470 | of 0000 | France ........................... 172/718 |
| 2319288 | of 0000 | France ........................... 172/718 |
| 103987 | of 0000 | Netherlands .................. 172/718 |
| 661914 | of 0000 | United Kingdom ........... 172/718 |
| 1141320 | of 0000 | United Kingdom ........... 111/7 |
| 1150723 | of 0000 | United Kingdom ........... 111/85 |
| 1200791 | of 0000 | United Kingdom ........... 172/718 |
| 1274219 | of 0000 | United Kingdom ........... 111/85 |
| 1360964 | of 0000 | United Kingdom ........... 111/7 |
| 1493346 | of 0000 | United Kingdom ........... 172/718 |
| 1574412 | of 0000 | United Kingdom ........... 111/7 |

Primary Examiner—James R. Feyrer
Attorney, Agent, or Firm—Cushman, Darby & Cushman

[57] ABSTRACT

A cultivating implement include a soil working tool having an elongate substantially planar blade. The blade extends sidewardly and downwardly at an acute angle to the vertical so that its plane is substantially parallel to the direction of movement through the soil and so that soil is lifted without inversion over the blade during passage through the soil. A movable extension is mounted to the blade trailing edge and is adjustable between first and second rigid positions to adjust the lifting action on the soil and thus adapt it to a wide variety of soil types and moisture conditions. At the lower end of the blade is a shoe member with an upwardly and rearwardly inclined upper surface at a leading end thereof, and an upright and rearwardly extending side surface substantially parallel to the direction of travel to provide a bearing surface for resisting lateral forces on the tool due to lifting action of the blade. The shoe member imparts lateral stability and factilitates penetration.

29 Claims, 21 Drawing Figures

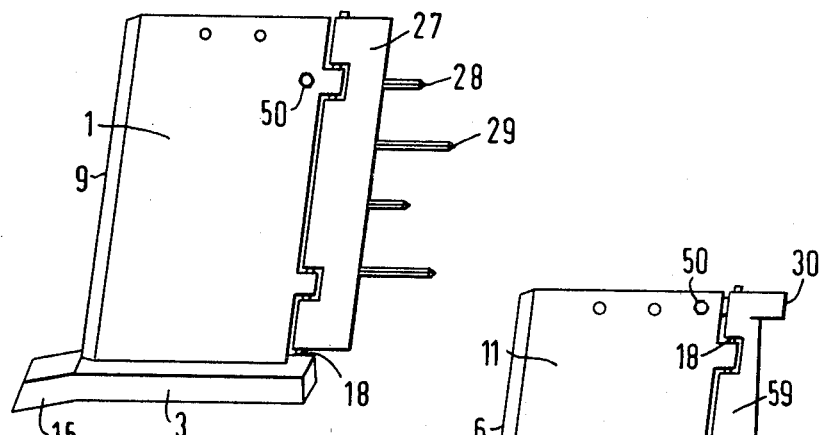
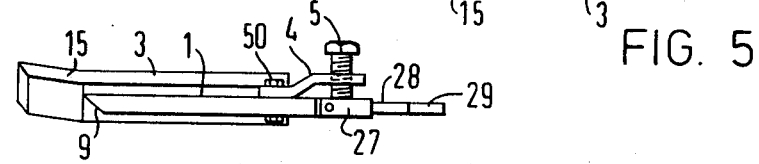
FIG. 4
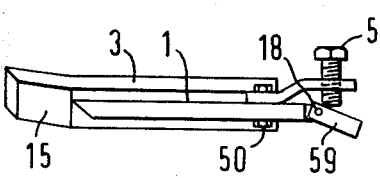
FIG. 6

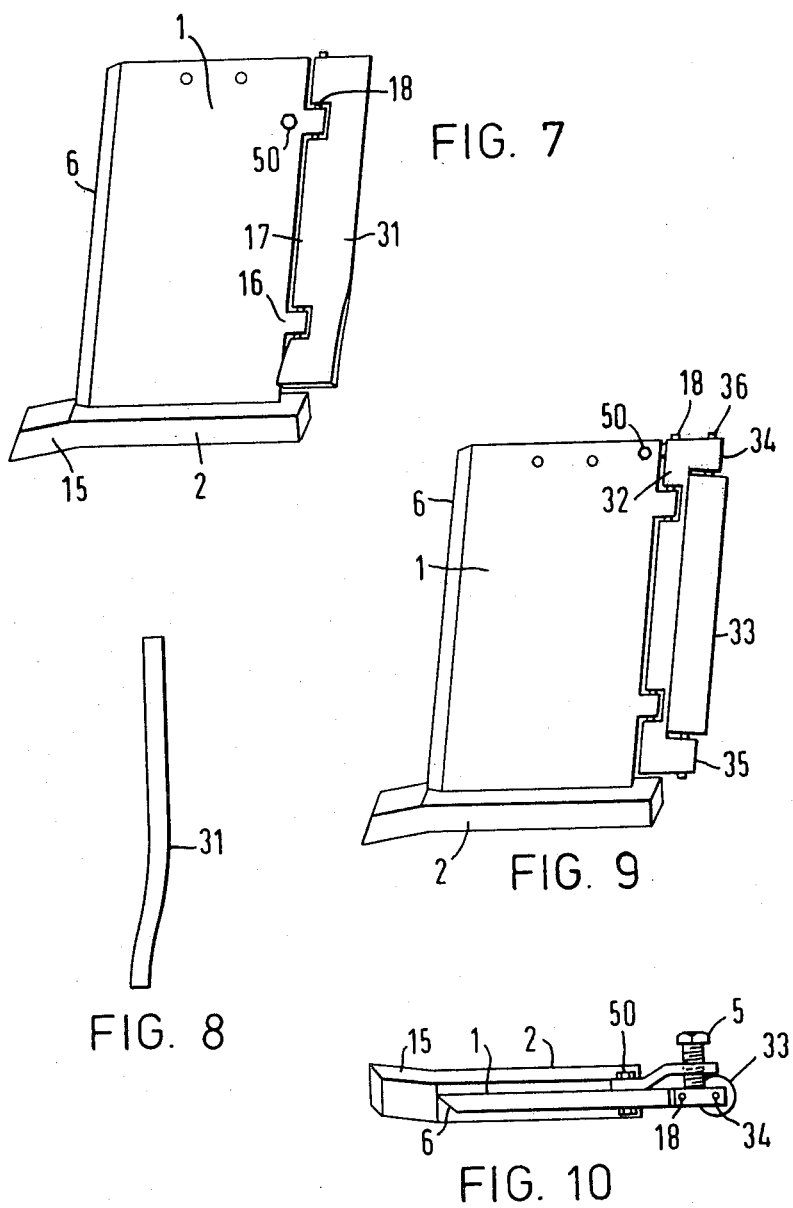

AGRONOMIC IMPLEMENT

This invention relates to an improved agronomic process, and to an improved implement for use therein. More specifically, it relates to an improved process for growing crops without the use of ploughing, and to an improved implement for preparing the soil prior to growing crops.

For hundreds of years, agricultural land has been prepared for the sowing of seed by the use of the mouldboard plough. The prime function of the plough is to kill weeds; but it also can have the effect of breaking up the soil, making it less compact, and creating a tilth in which seeds may be buried. Generally ploughing is followed by further operations for breaking up the soil, e.g. discing and harrowing, prior to sowing. However, ploughing uses substantial amounts of energy, in principle unnecessarily, in turning over the soil. Millions of tons of earth are lifted and inverted by the plough every year, using in nearly every case tractors powered by petroleum-based fuels, a non-renewable resource.

In the 1950's the discovery of the herbicide paraquat opened the way to novel methods of establishing crops, without the use of the plough. Paraquat was the first herbicide (killing all green growth) to be discovered which was totally inactivated in contact with the soil. Experiments with this new herbicide showed that it could replace the weed-killing function of the plough: that stubble or grassland could be sprayed with paraquat; and shortly thereafter seed could be drilled direct into the uncultivated ground; and that, in suitable circumstances, such seed would germinate as well as (sometimes better than) seed planted in ploughed land after conventional tilling techniques. During the 1960's this technique of "direct drilling" was developed for use in agriculture. Seed-drills capable of making a seed-furrow in untilled ground had to be designed (see for example U.K. Pat. Nos. 1150723 and 1274219) and manufactured; and the limitations of the technique explored, so as to be able to predict when the technique would work and when it would fail. This development has been succeeded by widespread adoption of the technique in the 1970's, with savings to farmers in fuel, in manpower and in time.

One limitation of the technique as it has been practised up to now is the type of soil on which it can be used. For success, the soil must have drainage, good structure and be uncompacted. On heavy land, the grooves cut for the seed by the drills frequently become waterlogged, and establishment of seed is patchy. Much agricultural land (over half the land farmed in Britain today) is not suitable for the direct drilling technique. Land may also, by the passage of heavy machinery, become too compacted to be suitable for the technique.

It is an object of the present invention to provide a loosening process avoiding the use of the plough which can be used on types of land hitherto inaccessible to direct drilling. It is a further object to provide an improved implement for use in such a process.

According to the present invention, in one aspect, we provide a process of planting crops in heavy or compacted land, comprising treating an area of such land with sufficient of a soil-inactivated total herbicide to kill weeds already growing therein, and thereafter drilling seed into the substantially undisturbed land surface, characterised in that prior to drilling the porosity of the soil is improved by making a series of adjacent substantially parallel cuts therethrough on a vertical diagonal whereby the body of the soil is fissured without substantial disturbance of the surface. As a further, optional, step the surface of the soil between adjacent cuts may be subjected to impact blows or pressure, for example by crumble rolling, to further assist rupture of the soil structure. Alternatively angled cutting e.g. using blades on rotatable shafts, may be deployed instead of crumble rollers.

The application of herbicide and the drilling of the seed are carried out in known manner. As the soil-inactivated total herbicide, the use of paraquat is preferred, on account of its rainfastness and rapid kill. It is conveniently sprayed from a tractor-mounted board at rates of about 0.75 to about 1.5 kilograms ion per hectare, depending on the weed cover on the soil to be treated. Glyphosate is another effective total soil-inactivated herbicide, useful at the same sort of rates, and other suitable herbicides will no doubt be discovered in the future. Drilling may be carried ou with a variety of specially designed drills, for example the drill described in U.K. No. 1274219, commonly known as the "tripledisc" drill. Drilling may be carried out at any time from several hours to several weeks after.

The distinguishing feature of the process of out invention, however, is the improvement of the porosity of the soil prior to drilling, by making a series of diagonal cuts therethrough, fissuring the soil without substantially disturbing the surface. If necessary these cuts can be supplemented by successive impact blows or pressure upon the lifted soil raised up, temporarily, by the fissuring blades. Such blows or pressure can be created by the action, for example, of a crumble roller mounted between adjacent blades and preferably just to the rear thereof so that each rod or bar of the crumble roller can press upon the soil just to the rear edge of the blade or just above, it, depending upon the soil conditions. As an alternative to impact blows or pressure the soil surface may be fissured by further cutting from above the surface, and created by the action of, for example, angled cutting blades mounted on rotatable shafts. This treatment may be carried out at any time before drilling either before or after application of weedkiller. The effects of the treatment last for some time, e.g. several months or in some cases years, and can be quite dramatic. Thus in one case a plot treated in this way prior to direct drilling gave an 60% improvement in cereal yield as compared with a comparable adjacent plot not so treated. If desired fertiliser can be introduced into the ground at the same time as fissuring takes place.

The diagonal cuts by which the soil is fissured according to our invention are made by a diagonally mounted knife or an array of such knives, dragged through the ground by a vehicle such as a tractor. It is known from U.K. Pat. No. 1,493,346 to use knives or blades of this type to break up soil. This patent describes a sub-soil breaking soil cultivation implement comprising one or more blades extending downwardly and sideways into the soil and having a leading cutting edge (preferably sloped forwardly and downwardly) which is bevelled to raise soil over the blade and to avoid compression of soil under the blade as it cuts. The invention is described for use in the improvement of grassland, or in the improvement of arable land in conjunction with the plough, or for use in establishing drainage channels which are simultaneously filled with sand, or for use in laying flexible pipe. This device as described in U.K. Pat. No. 1,493,346 is in some special circumstances suitable for use in the process of our invention, but in general we prefer to use a modified device as described below.

The device of U.K. Pat. No. 1,493,346 may be used in our invention in not very heavy soils which are fairly dry and friable, provided the blades are mounted parallel to the direction of forward motion of the vehicle impelling them. Then, provided the soil is of just the right type, the blade causes just sufficient break-up of the soil to imrove porosity without substantially disturbing the surface, and subsequent drilling can be carried out effectively in accordance with the invention. However, on many heavier and less friable soils, the blade so set will not break up the soil sufficiently. Attempts have been made to increase break-up by setting the plane of the blades at a slight angle to the direction of forward motion, so as to increase the displacement of the soil by the blades. This however has generally proved impractical. The slight divergence between the plane of the blades and the direction of forward motion considerably increases the load on the tractor and moreover drags it off course. Also, the blades may bend, and if made thicker to avoid this, disturb the soil surface unduly.

Accordingly, we have devised for use in our process an imroved implement which can be satisfactorily employed in various types of heavy or compacted soil with differing moisture content.

The present invention provides a cultivating implement comprising mounting means and at least one soil working tool supported on the mounting means for movement through the soil, the tool having an elongate blade arranged to extend downwards and at an acute angle to the vertical, the blade having a leading edge bevelled so as to lift soil over the blade during passage through the soil, the tool having at the trailing edge of the blade a movable extension which is adjustable between a position directly behind the trailing edge and a position projecting upwardly from the trailing edge, in the latter position the extension increasing the lifting action on soil passing over the blade.

Preferably the blade is substantially flat and the extension is a flap pivotally connected at the trailing edge of the blade and adjustable, for example, by a screw. The trailing edge of the flap may carry rearwardly projecting rods or knives.

The extension may also be a roller.

The blade is preferably supported on the mounting mens so as to have its plane substantially parallel to the direction of its movement through the soil when in use. By this means compaction of the soil beneath the blade as it travels through the soil is very substantially reduced.

The mounting means is preferably constructed so as to be detachably connectable to a vehicle.

In a further aspect our invention comprises an implement for use in the improvement of the soil which comprises a generally flat earth-cutting blade, supported by mounting means for carrying it on a vehicle and adapted, for example by hydraulic or other powered mechanism, to lower it into and, preferably aided by an adjustable depth wheel running over the ground surface and secured to the mounting means, hold it in an operative position for movement through the soil by traction from the vehicle, with the leading edge of the blade sloping forwardly and the plane of the blade sloping sideways and downwardly so as to make a diagonal cut in the soil, the leading edge being bevelled on its upper surface so as to lift soil over the blade as it passes through, without compacting it beneath the blade, characterised in that the blade in the operative position is supported with its plane parallel to the direction of motion of the vehicle, and is provided with a hinged extension at its trailing edge which is adjustable between a position substantially directly behind the blade and a projecting position which increases the displacement of soil passing above the blade. Preferably the tool comprises a gang of such blades mounted adjacently, in rank or in echelon; and preferably each blade in the gang is mounted with its bottom edge approximately vertically below the top edge of its neighbour. A degree of vibration of the blades can, if desired, be provided. Preferably, also, in front of each blade is independently mounted a flat, flexible cutting disc, the plane thereof lying in the same plane as the blade behind it. Such discs are preferably pivotally mounted on the mounting means, e.g. framework, carrying the blades, and are loaded, e.g. by spring action. Preferably they are fitted with scrapers.

As an optional feature the tool of the invention may further be provided with rollers, e.g. crumble rollers, located between adjacent blades, such crumble rollers not having a continuous arcuate surface but consisting of a plurality of parallel or spirally arranged rods or bars disposed in a circumference, as viewed from the side, so as to present, as it were, an interrupted roller surface. Preferably such a roller, or crumble roller, is disposed in such a position relative to the blades that the surface or the rods or bars, successively impact upon and/or exert pressure on the soil at a point above or just rearward of the trailing edge of the hinged extension (flap) of the blade. As an alternative to crumble rollers, angled blades mounted on rotatable shafts may be deployed to provide further fissuring of the soil structure downwardly from above ground level. These shafts are preferably biassed towards the soil e.g. by springs and the same applies to the crumble rollers. Both rollers and cutting knive shafts can be friction driven, or power driven from the power take-off shaft of the tractor pulling the tool or device. The axes of the crumble rollers or shafts are preferably disposed to lie horizontally of the soil surface and at right angles to the direction of pull of the tool or device as a whole.

It is found that a tool of this type may be used to improve soil porosity in many types of soil, without substantial disturbance of the soil surface. Provided the displacement of the hinged extension is appropriate to the soil type, the load on the tractor is not excessive, nor is it diverted from its course, but nevertheless an appropriate degree of soil fissuring may be obtained.

The (or each) blade is preferably of uniform thickness over its working surface, though it may, if desired, increase somewhat in thickness from upper to lower edge, or vice versa, or from front to rear. Its lower edge is preferably horizontal in the operative position, and may conveniently carry a shoe projecting forwardly and downwardly where the lower and leading edges meet. This show helps to draw the blade down into the soil.

The hinged extension on the trailing edge of the blade may be of various kinds. It may be a simple flap in the shape of a rectangle or parallelogram, one of its longer sides being hinged along the trailing edge of the blade. It may be a flap in the shape of a triangle or trapezium, preferably increasing in width towards the lower edge of the blade. It may be mounted along the whole of the trailing edge, or along part only, preferably the part adjacent the lower edge.

Possible forms of extension other than simple flaps include rollers; flaps bearing backwardly-projecting rods or knives; and flaps which are distorted upwardly (in the operative position) adjacent the lower edge of the blade. More than one extension may be mounted, one above the other.

The blades may be hollow and holed to serve as distributors for liquid fertiliser during fissuring. Alternatively separate fertiliser distributing tubes may be used, for example located between, or behind, the blade and its rear flap or roller. These tubes may be perforated. If desired these tubes, or further tubes, may be used to introduce materials into the fissures which will, or can be made to, explode to provide further disruption of the soil structure.

Embodiments of the invention will now be described with reference to the drawings, in which:

FIG. 3 is a side view of a blade with a second type of extension;

FIG 4 is a top edgewise view of the blade of FIG. 3;

FIG. 5 is a side view of a blade with a third type of extension;

FIG. 6 is a top edgewise view of the blade of FIG. 5;

FIG. 7 is a side view of a blade with a fourth type of extension.

FIG. 8 is an end view of the extension shown in FIG. 7.

FIG. 9 is a side view of a blade with an extension in the form of a roller.

FIG. 10 is a top edgewise view of the blade of FIG. 9.

Figure 1:
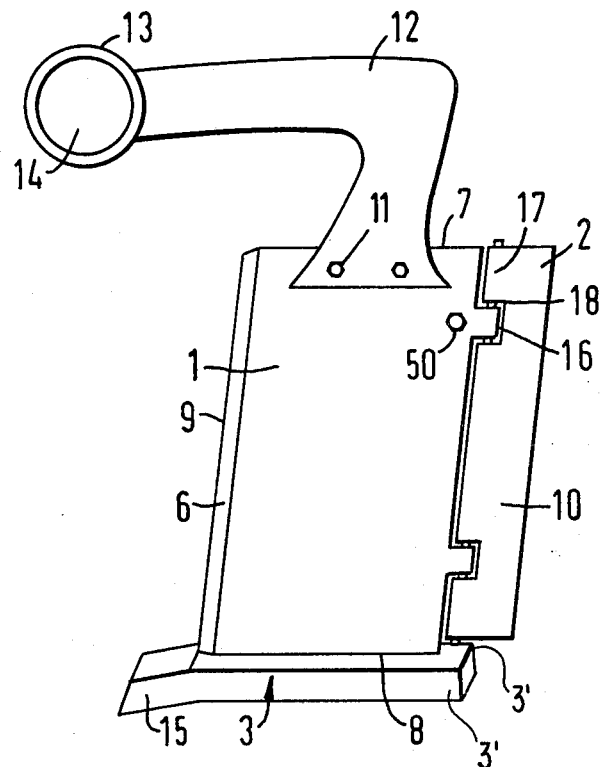
FIG. 1 is a side view of a blade for use in the invention shown with operative position, mounted on a tractor drawbar.
Figure 2:
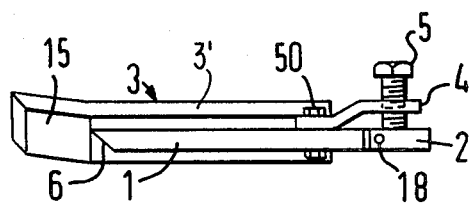
FIG. 2 is a top view of the blade of FIG. 1, viewed edgewise to the plane of the blade.

With reference first to FIGS. 1 and 2, a parallel-sided blade 1 is shown fastened by bolts 11 to an elbow 12, the other end of which is secured to a collar 13 mounted for rotation on a transverse bar 14 carried by a tractor (not shown). The elbow 12 projects sideways at about 45° to the axis of bar 14, holding the blade 1 at the same angle. The elbow also orients the blade 1 in the fore-and-aft position so that its sides are closely aligned with the forward motion of the tractor. The blade 1 has parallel edges, the upper and lower edges 7 and 8 being horizontal and the leading and trailing edges 9 and 10 sloping forwardly and downwardly. The leading edge 9 is provided with a downwardly sloping bevel 6 which terminates in a sharp soil-cutting edge, and serves as a soil-lifting surface. The lower edge 8 is fitted with a shoe 3, the front of which is turned downwards to form a nose 15 terminating in a cutting edge. The trailing edge 10 is provided with hasps 16, meshing with hasps 17 of an extension flap 2. A steel rod 18 passes through hasps 16 and 17 and serves as pivot for the flap 2. A stop 4 is fastened by a bolt 50 on the lower side near the top of trailing edge 10; this carries a grubscrew 5 which abuts the flap 2. In FIGS. 1 and 2 flap 2 is shown substantially parallel to the blade 1, but by screwing in screw 5 it can be slanted out of the plane of the blade 1 to a greater or lesser degree.

The shoe 3, and the forwardly and downwardly projecting nose 15 thereof, help draw the blade 1 into the soil. The shoe has flat side surfaces 3' (see FIGS. 1 and 2 in particular) which materially improve stability against unwanted sideways thrusts tending to cause wander from a forward straight line of movement, comprising bearing means resisting lateral forces on blade 1 due to lifting action of the blade in the soil.

FIGS. 3 and 4 show the same type of blade fitted with an alternative form of extension. Blade 1, shoe 3 and steel pivot rod 18 are as before; but flap 2 is replaced by flap 27, carrying two short knives 28 and two longer knives 29 projecting backwards in the plane of the flap 27. The flap 27 is adjusted, in the same way as the flap 2, by stop 4 and grubscrew 5.

FIGS. 5 and 6 show the same type of blade as before fitted with an alternative extension 59. This is flat but non-uniform in outline, with a narrow projecting bar 30 at the top followed by a steady increase in depth down the flap. It is adjusted in the same way as before.

FIGS. 7 and 8 show the same type of blade as before fitted with an alternative extension 31. This is flat over most of its length, but curves upwards out of the plane towards its lower end. It is adjustable as before.

FIGS. 9 and 10 show a blade of the same type as before fitted with an extension 32 carrying a roller 33. The extension is mounted on the blade in the same way as before, but carries two arms 34, 35 at its upper and lower ends between which a roller 33 in the form of a right cylinder is mounted for free rotation on a steel rod 36. The angle of the extension 32 is adjustable by stop 4 and screw 5 as before.

Figure 11:
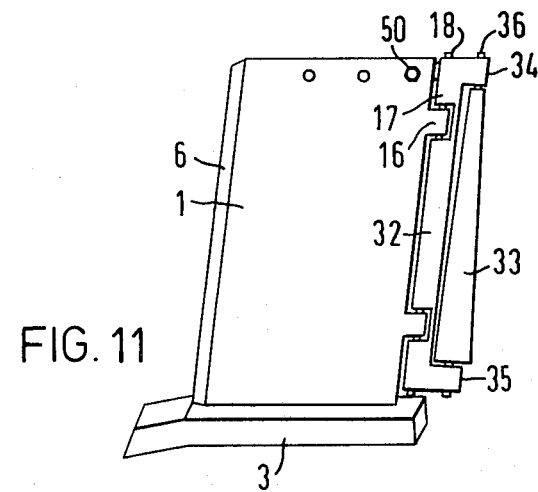
FIG. 11 is a side view of a blade with a different roller extension.

FIG. 11 shows a blade and extension as in FIGS. 9 and 10, but the roller 33 has been replaced by a roller 37 of gently tapering frustro-conical form, mounted with its thicker end downwards. Its attitude is adjustable in the same way as before.

Figure 11A:
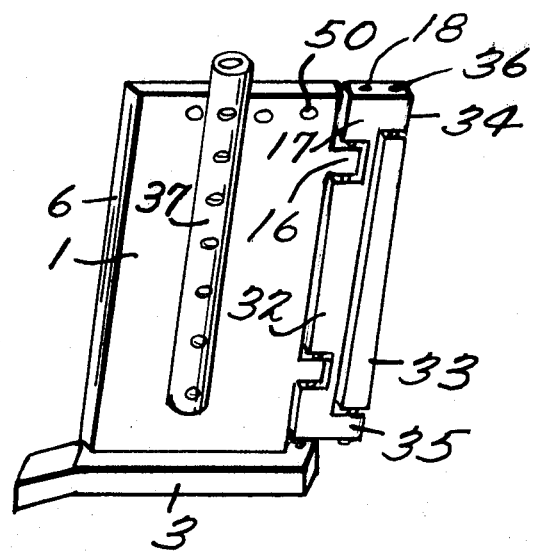
FIG. 11a is a side view like FIG. 11 only illustrating the blade in combination with a perforated tube for the distribution of solids or liquids into the soil.

The blade 1 may be hollow, or—as illustrated in FIG. 11a—it may carry a perforated tube 37. By utilizing a hollow blade, or one with the tube 37, the distribution of solids or liquids into the soil is facilitated.

The use of the device will now be described with particular reference to FIGS. 1, 2 and 12.

Figure 12:
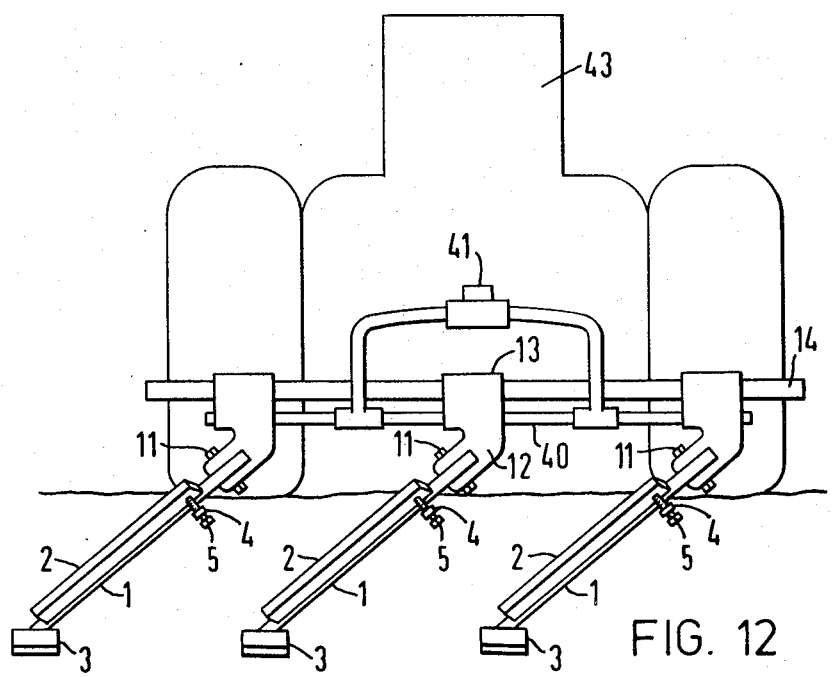
FIG. 12 is a rear view of a gang of blades of the kind shown in FIGS. 1 and 2 being drawn through the soil.

FIG. 12 shows a gang 40 of three blades, of the type shown in FIGS. 1 and 2, mounted on a tractor 43. For transport, the gang 40 is rotated upwardly about the bar 14 by a hydraulic ram 41 until the lower edges 8 of the blades 1 are vertical. The screws 5 on each blade are adjusted to set the flaps 2 at the angle appropriate to the soil being worked (the heavier the soil, the larger the angle). When the tractor 43 is positioned to begin working, the ram 41 lowers blades 1 into a position in which the noses 15 dig into the earth.

The tractor then moves forward, and the blades 1 are forced into the soil by the combined action of the ram 41 and the soil acting on the noses 15 and shoes 3. In the operative position the blades 1 cut diagonally through the soil, lifting the soil over their upper sides, without significant compression on the under sides. The total amount of lifting depends on the degree to which the flaps 2 are cocked up, and by this means the degree of fissuring in the soil is controlled as required. As the tool is carried along, the surface of the land lifts up and subsides like a wave, but apart from parallel trenches along the lines of entry of the blades 1, the surface of the soil is afterwards remarkably free from disturbance.

Figure 12A:
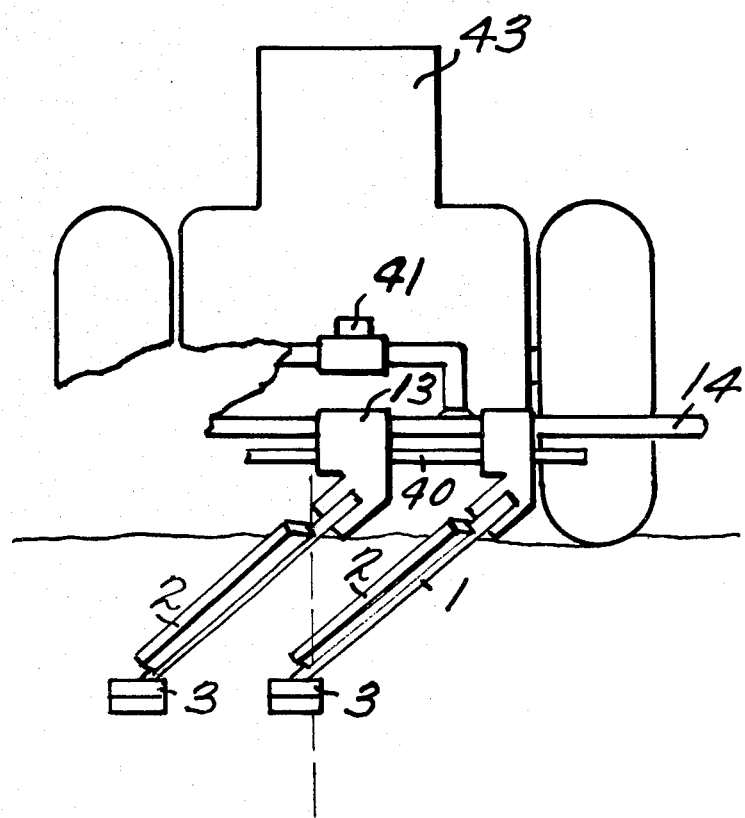
FIG. 12a is a rear view of a gang of blades as illustrated in FIG. 12, shown mounted in echelon.

FIG. 12a shows an arrangement like that in FIG. 12 only showing the blades 1 mounting in rank or echelon. In such an arrangement, the bottom edge of each blade 1 is approximately vertically below the top edge of its neighbor. These blades may also be staggered fore-and-aft, as are the blades illustrated in FIG. 17. The term "echelon" as used in the claims refers to a mounting of a gang with the bottom edge of each blade approximately vertically below the the top edge of its neighbor.

Figure 13:
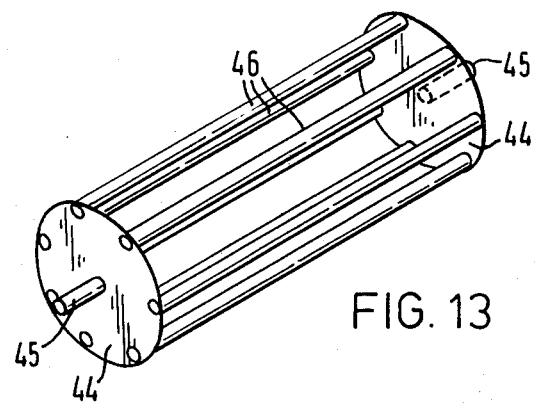
FIG. 13 is a perspective view of a crumble roller.

FIG. 13 shows a crumble roller having circular side plates 44 having mounting shafts 45 and cross bars 46 for pressing upon the soil surface.

Figure 14:
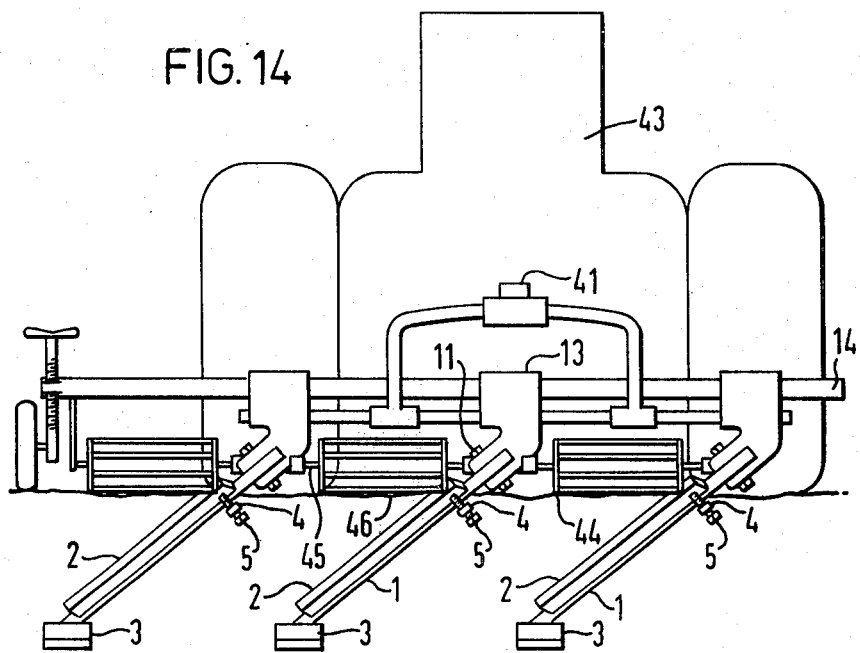
FIG. 14 is a rear view of a gang of blades with crumble rollers of the kind shown in FIG. 13 disposed between adjacent blades.

FIG. 14 shows three crumble rollers mounted so as to operate in conjunction with the blades 1 of the device illustrated in FIG. 12. The shafts 45 are rotatably mounted on the elbows 12 by way of extension arms (not shown) therefrom. In an alternative embodiment (not shown) the shafts 45 are rotatably mounted on arms extending separately from the transverse bar 14 or from another frame member of the tool. The action of the crumble rollers is to further disrupt and break up the soil structure near the soil surface, where there may be trash and/or matted roots or compression of the soil by animal hooves.

Figure 15:
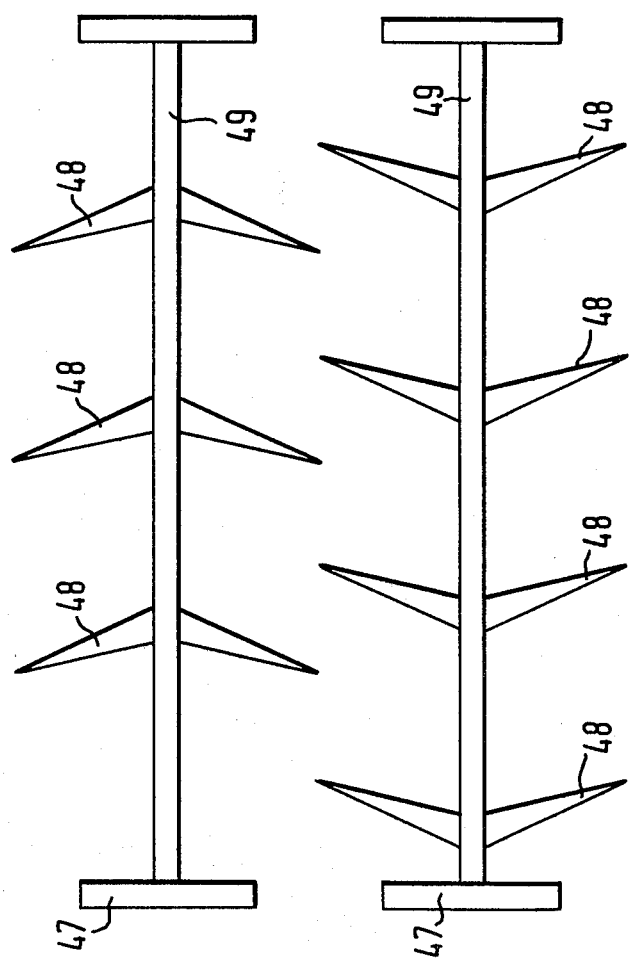
FIG. 15 is a plan view of a pair of rotatable cutting rollers with blades which may be used in the place of a crumble roller.

FIG. 15 shows a pair of cutting rollers 47 with angled blades 48 disposed circumferentially around shafts 49. A pair of these rollers may be deployed in the place of a crumble roller. The shafts 49 are rotatable and may be friction driven by contact with the soil surface; or they may be rotated by a suitable mechanical linkage (not shown) from the power take-off shaft of the tractor. The blades of the second cutting roller are angled in a different direction to those of the first roller and the shafts 49 can be variably biassed, for example by spring loading, so that the blades are forced into the soil to a greater or lesser degree depending upon the required amount of penetration of the soil.

In carrying out the process of the invention, this treatment of the soil may then be followed by herbicidal spraying, e.g. of paraquat at a rate of 1 Kg ion per hectare are sprayed in 200 gallons of water from a boom sprayer, followed at an interval of a few days by drilling e.g. with barley seed, using a triple disc drill. A suitable drill is the Hestair-Bettinson "3D" drill.

Instead of the blade and extension shown in FIGS. 1 and 2, those shown in each of FIGS. 3 and 4, 5 and 6, 7 and 8, 9 and 10, and 11 may be used instead. The extension of FIGS. 3 and 4 increases break-up of the soil when the extension is set at an angle, through the cutting action of projecting knives. The extensions shown in FIGS. 5 and 6, and in 7 and 8, both project further the deeper they are in the soil, so that the soil is disturbed more at a greater depth. The rollers of FIGS. 9 and 10, and 11 roll against the soil above (rather than the soil below, which they are not forced into contact with) thereby usefully reducing the drag on the tractor. The frustroconical roller of FIG. 11, like the extensions of FIGS. 5–8, disturbs the soil at greater depths.

Instead of the stop and grubscrew shown, other devices could be used to set or control the angle of the extensions to the blades. It is particularly convenient to do this by hydraulic means, because all blades could then be set simultaneously by the touch of a button (rather than individually by hand as in the device illustrated). This may even be done while the device is being operated in a field; if the soil type is different in different parts of the field.

Figure 16:
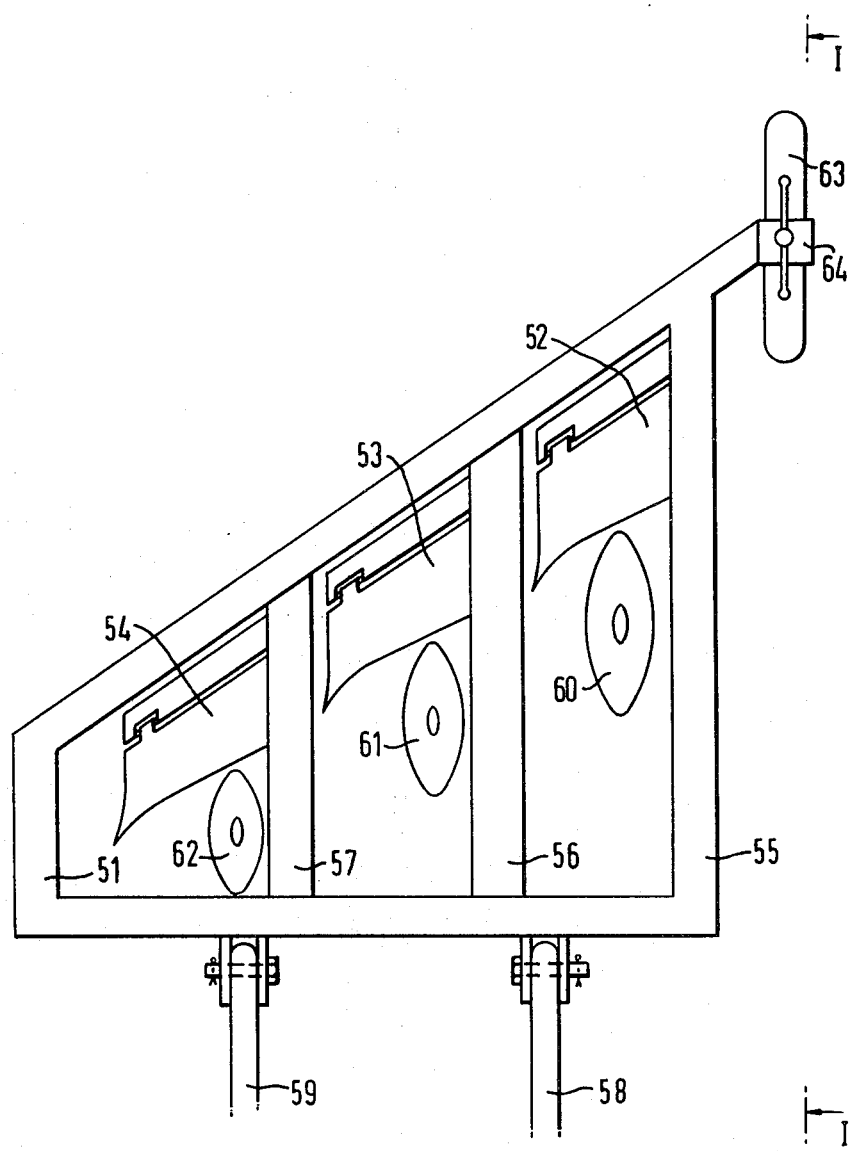
FIG. 16 is illustrative of a further embodiment of the invention and shows, schematically in plan view, an implement having an arrangement on a framework of blades of the kind shown in FIGS. 1 and 2 but with a modified, slimmer, and more sharply pointed nose and shoe portion to each 'blade'.

FIGS. 16, 17, 18 and 19 show a further implement according to the invention. In this device, the plan view of FIG. 16 shows three blades 52, 53, 54 mounted on a framework 51 of metal girders and are bolted to griders 55, 56, 57 thereof. The framework 51 has tow bars 58, 59 for connection to a tractor (not shown). Discs 60, 61, 62 are located in front of the blades and are mounted on the girders 55, 56, 57 by a mechanism (not shown) which is illustrated in detail in FIGS. 18 and 19. A ground or depth wheel 63, which is adjustable in height by a raising and lowering mechanism 64 (FIG. 17) is set to regulate the depth to which the blades penetrate below the soil surface when the device is in use.

Figure 17:
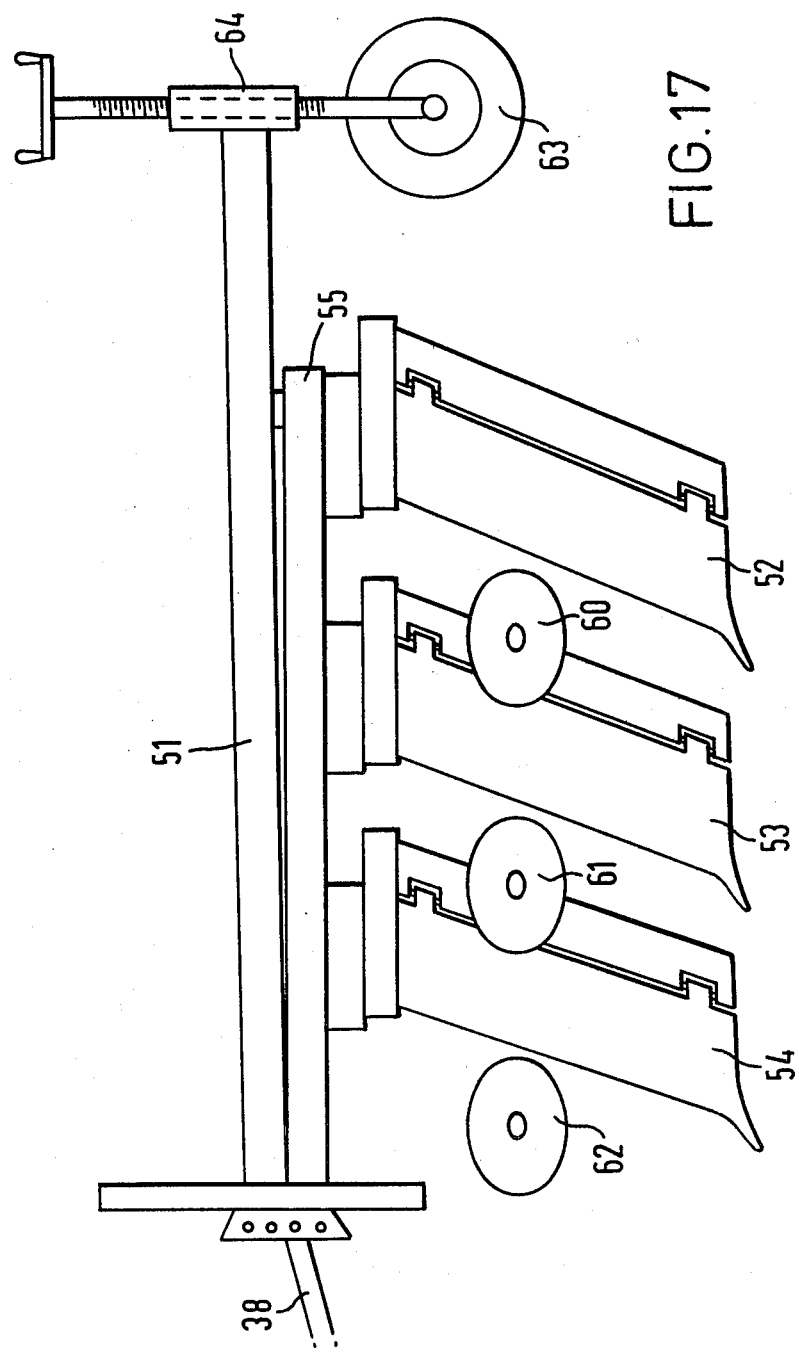
FIG. 17 is a side elevation of the implement shown in FIG. 16 on the line I—I thereof.

FIG. 17 shows the implement of FIG. 16 in side elevation viewed on the line I—I of FIG. 16. The slit cutting discs 60, 61, 62 lie in substantially the same plane as the blades 52, 53, 54 and in use the discs cut a slit in the soil which assists the penetration and movement of the fissuring blades into, and through, the soil.

Figure 18:
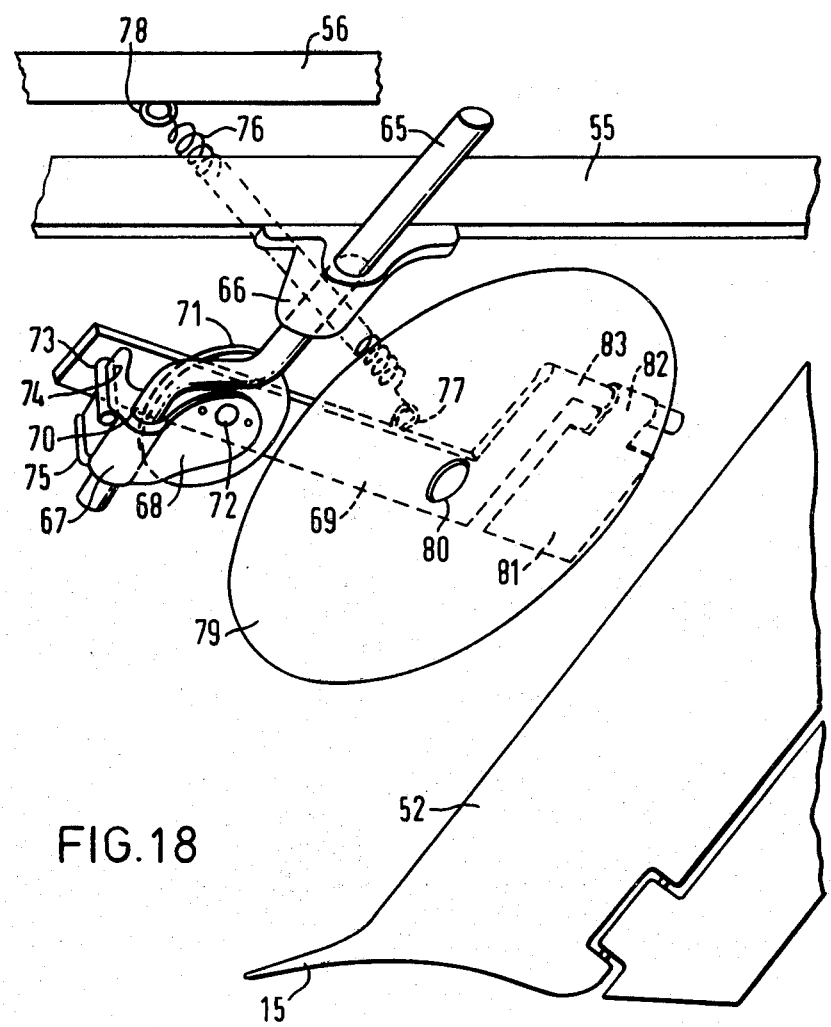
FIG. 18 is a larger scale view of a blade and disc as illustrated in FIG. 17 and shows details of an assembly for mounting the disc upon the implement framework.
Figure 19:
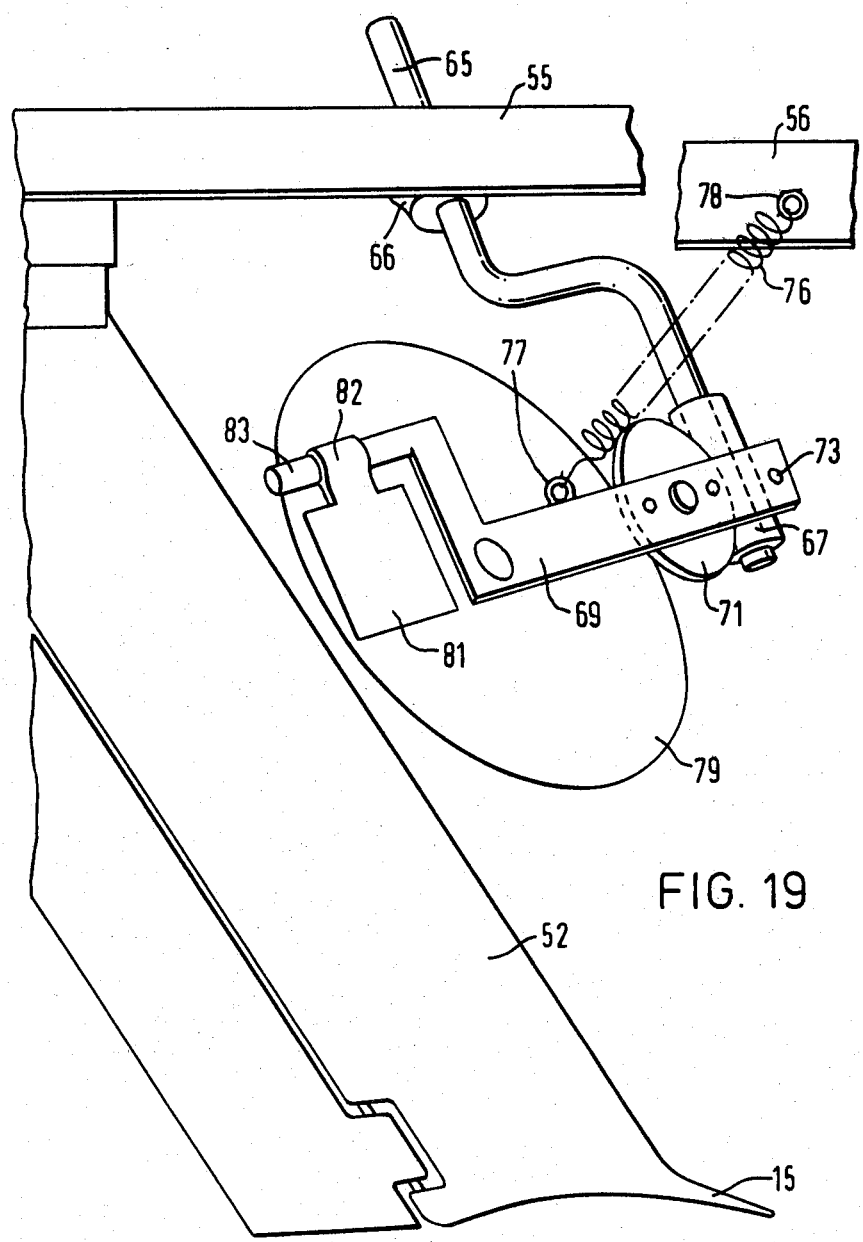
FIG. 19 is a view similar to that of FIG. 18 but from the opposite side to the side used in FIG. 18.

FIGS. 18 and 19 show, in enlarged fashion, blade 52 and its associated disc 60 and illustrate mechanisms for the mounting of the discs on the framework 51 of the implement. A cranked rod 65 is adjustably held at one end by a clamp 66 to the girder 55 and to its other end is pivotally clamped a second clamp 67 having an integral abutment 68 in which is pivotally mounted an elongated flat metal bar 69. The clamp 67 and abutment 68 can pivot around the bar 65 in a bush 70 and the bar 69 can pivot around the abutment 68 in a bush 72. Interposed between 68 and 69 is a rubber disc 71 to provide a cushioning resilience between them. Pivotal movement of the elongated flat bar 69 in the bush 72 is restricted by a pin 73 attached to the bar lying within a trough on the clamp 67 having raised edges 74, 75 which act as stops.

Pivotal movement of the elongated bar 69 (by pivoting of the clamp 67 about the rod 65 in the bush 70) in the plane at right angles to the foregoing plane of pivotal movement is restricted by a retaining spring 76 extending between a loop 77 on the bar 69 and an attachment loop 78 to the girder 56, that is the girder adjacent to the girder 55 and on which is mounted the adjacent blade 53.

By this mechanism the flat, flexible, metal disc 79, which is rotatably mounted by a bush 80 on the elongated bar 69, is enabled to pivot bodily to a limited degree in two planes at right angles to each other. The first of these planes is the plane in which the disc itself normally lies (and the associated blade) and the other is at right angles to this. These degrees of freedom of movement assist the disc in penetrating and cutting through the soil without damage to its edges or mounting, e.g. by stones or other obstacles.

The disc 79 is equipped with a scraper 81 which is pressed against the surface of the disc by a spring concealed within its point of pivotal attachment 82 to a cranked extension 83 of the elongated bar 69.

The implement shown in FIGS. 15, 16, 17, 18 and 19 may incorporate one or more rollers of the kind hereinbefore described, for example as shown in FIG. 13, or one or more pairs of shafts with rotating cutting knives, for example as shown in FIG. 15. It may also use any of, or any combination of the blades shown in FIGS. 1, 2, 3, 4, 5, 6, 7, 8, 9, 10 or 11.

We claim:

1. A cultivating implement comprising: a frame mounted for movement in a direction of travel; and at least one soil working tool mounted on said frame, said tool including a blade having a portion with a leading and trailing edge, which portion, in operation, extends sidewardly and downwardly into the soil in a plane substantially parallel to the direction of travel edgewise through the soil and inclined at an acute angle to the vertical so as to lift soil, without inversion, lying above the blade; said tool having at a lower end of said inclined blade portion a shoe member with an upwardly and rearwardly inclined upper surface at a leading end thereof, and a trailing edge thereof, and an upright and rearwardly extending side surface, said side surface being substantially parallel to the direction of travel and comprising bearing surface means for resisting lateral forces on the tool due to the lifting action of the blade on the soil.

2. A cultivating implement according to claim 1 wherein the leading end of the inclined upper surface of the shoe member is located in advance of the leading edge of the inclined blade portion.

3. A cultivating implement according to claim 1 or 2 wherein the rearward end of said side surface of the shoe member is to the rear of the trailing edge of the inclined blade portion.

4. A cutivating implement comprising:
at least one soil working tool having an elongate substantially planar blade with a trailing edge having a movable extension;
a mounting structure movable over soil;
means for connecting said blade to said mounting structure so that said blade extends sidewardly and downwardly at an acute angle to the vertical; and so that its plane is substantially parallel to the direction of movement through the soil; and so that soil is lifted, without inversion, over the blade during passage through the soil; and
means for movably mounting said movable extension to said blade trailing edge so that said movable extension is adjustable between a rigid first position directly behind said trailing edge, and a rigid second position projecting upwardly from said trailing edge to increase the lifting action on soil passing over said blade.

5. A cultivating implement as recited in claim 4 wherein said elongate blade has a beveled leading edge, and wherein said means for connecting said blade to said mounting structure mounts said blade so that the beveled leading edge is positioned to lift soil, without inversion, over the blade.

6. A cultivating implement as recited in claim 5 wherein said movable extension is a flap pivotally connected to the trailing edge of said blade.

7. A cultivating implement as recited in claim 6 further comprising screw means for adjusting the position of said flap.

8. An implement for use in improving land porosity, comprising:
a vehicle;
a blade raising and lowering mechanism attached to said vehicle for raising and lowering a blade between positions penetrating, and out of, soil;
an elongate generally planar blade comprising a leading edge and a trailing edge having a movable extension;
means for mounting said blade to said blade raising and lowering mechanism so that when lowered into the soil, said blade is held with the leading edge thereof sloping forwardly and the plane of the blade sloping sideways and downwardly so as to make a diagonal soil-lifting pass in the soil and parallel to the direction of motion of said vehicle with soil lifted over the blade, without inversion and without substantial compaction of soil beneath the blade; and
hinge means for movably mounting said movable extension to said blade trailing edge so that said movable extension is adjustable between a first rigid position directly behind said trailing edge, and a second rigid position projecting upwardly from said trailing edge to increase the displacement action on soil passing over said blade.

9. An implement as recited in claim 8 wherein said elongate generally planar blade leading edge includes a beveled upper surface, and wherein said means for mounting said blade mounts the blade so that said beveled upper surface thereof lifts soil over the blade.

10. An implement as recited in claim 8 comprising a plurality of said blades, and means for mounting said blades to said blade raising and lowering mechanism so that said blades are in echelon.

11. An implement as recited in claim 8 further comprising a flat, flexible cutting disc located in front of, and lying in the same plane as, said blade.

12. An implement as recited in claim 8 further comprising a crumble roller mounted behind said blade.

13. An implement as recited in claim 8 further comprising a perforated tube carried by said blade for the distribution of solids or liquids into the soil.

14. An implement as recited in claim 8 further comprising a shoe member mounted at the bottom of said blade, said shoe member having an upwardly and rearwardly inclined upper surface at a leading end thereof, and a flat side surface, said side surface being substantially parallel to the direction of motion of said vehicle and comprising bearing surface means which resist lateral forces on the blade due to the lifting action of the blade in the soil.

15. An implement as recited in claim 14 wherein said shoe member comprises a nose at its leading end, said nose projecting forwardly and downwardly and comprising means for drawing said blade down into the soil when said blade is being brought into operation.

16. A cutivating implement according to claim 14 wherein the leading end of the inclined upper surface of the shoe member is located in advance of the leading edge of the inclined blade portion.

17. A cultivating implement according to claim 14 or 15 wherein the rearward end of said side surface of the shoe member is to the rear of the trailing edge of the inclined blade portion.

18. A cultivating implement according to claim 17 wherein the leading end of the inclined upper surface of the shoe member is located in advance of the leading edge of the inclined blade portion.

19. A cultivating implement comprising a frame mounted for movement in a direction of travel; and at least one soil working tool mounted on said frame; said tool including a substantially planar blade having a portion which, in operation, extends downwardly into the soil in a plane substantially parallel to its direction of travel edgewise through the soil and inclined at an acute angle to the vertical so as to lift soil lying above the blade, without inversion; said tool having an extension member, and means for mounting said extension member at a trailing edge of the inclined blade portion so that it is adjustable to lie in alignment with the plane of the blade or at a selected inclination upwardly with respect to said plane to increase the lifting action, without inversion, upon soil lying above the blade; said tool also having at a lower end of the inclined blade portion a shoe member with an upwardly and rewardly inclined upper surface at a leading end thereof, and an upright and rearwardly extending side surface, said side surface being substantially parallel to the direction of travel and comprising bearing surface means for resisting lateral forces on the tool due to the lifting action of the blade on the soil.

20. An implement as claimed in claim 1 or claim 19 wherein the shoe member at its leading end includes a nose which projects forwardly and downwardly, comprising means for drawing the blade down into the soil when the tool is being brought into operation.

21. A cultivating implement according to claim 35 wherein the leading end of the inclined upper surface of the shoe member is located in advance of the leading edge of the inclined blade portion.

22. A cultivating implement according to claims 37 or 19 wherein the rearward end of said side surface of the shoe member is to the rear of the trailing edge of the inclined blade portion.

23. An implement as recited in claim 22 wherein the shoe member at its leading end includes a nose which projects forwardly and downwardly, comprising means for drawing the blade down into the soil when the tool is being brought into operation.

24. An implement as claimed in claims 1 or 19 wherein a cutting disc is located in front of, to lie in the same place as, said blade.

25. An implement as claimed in claims 1 or 19 wherein a rotatable angled soil-cutting knife is mounted behind the blade.

26. A cultivating implement as recited in claims 1 or 19 further comprising a plurality of said blades, said blades mounted in echelon on said frame.

27. A cultivating implement according to claims 1 or 19 wherein the frame includes a leading frame member extending horizontally at right angles to the direction of travel and arranged for attachment to a tractor towing linkage, side frame members attached at opposite ends of the leading frame member and extending parallel to the direction of travel, and a rear frame member extending between and attached to the side frame members, the soil working tool attached to the rear frame member.

28. A cultivating implement according to claims 1 or 19 comprising a depth control wheel mounted on the frame and adjustable relative to the frame, and comprising means for assisting in the control of the depth at which the soil working tool operates in use.

29. A cultivating implement according to claims 4, 8, 1 or 19 wherein the blade is angled at about 45° to the vertical.

* * * * *